United States Patent
Haridass et al.

(10) Patent No.: US 9,697,306 B1
(45) Date of Patent: *Jul. 4, 2017

(54) FORMAL VERIFICATION DRIVEN POWER MODELING AND DESIGN VERIFICATION

(71) Applicant: International Business Machines Corporation, Armonk, NY (US)

(72) Inventors: Anand Haridass, Bangalore (IN); Arun Joseph, Bangalore (IN); Pradeep Kumar Nalla, Bangalore (IN); Rahul M. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,561

(22) Filed: Jul. 12, 2016

Related U.S. Application Data

(63) Continuation of application No. 15/139,454, filed on Apr. 27, 2016, now Pat. No. 9,460,251, which is a
(Continued)

(51) Int. Cl.
*G06G 7/54* (2006.01)
*G06F 17/50* (2006.01)
(Continued)

(52) U.S. Cl.
CPC ............ *G06F 17/5009* (2013.01); *G06F 1/26* (2013.01); *G06F 17/10* (2013.01); *G06F 17/504* (2013.01);
(Continued)

(58) Field of Classification Search
CPC ........ G06F 17/5009; G06F 17/50; G06F 1/26; G06F 17/10; G06F 17/5036;
(Continued)

(56) References Cited

U.S. PATENT DOCUMENTS

| | | |
|---|---|---|
| 6,598,209 B1 | 7/2003 | Sokolov |
| 7,243,320 B2 | 7/2007 | Chiu et al. |

(Continued)

OTHER PUBLICATIONS

Haridass et al., "Formal Verification Driven Power Modeling and Design Verification", U.S. Appl. No. 15/041,068, filed Feb. 11, 2016, 24 pages.
(Continued)

*Primary Examiner* — Cedric D Johnson
(74) *Attorney, Agent, or Firm* — Aaron N. Pontikos

(57) ABSTRACT

A computer program product includes program instructions to: Receive a unit including register transfer level content for a component of an integrated circuit and one or more IP blocks; Select one or more input pins for each IP block; Assign a numerical value of either zero or one to each of the one or more input pins to yield at least one numerical sequence; For each numerical sequence, perform a check to yield a number of fails, wherein the check is formal verification of each of the one or more IP blocks; Determine a simulation condition for power modeling of the unit based on optimizing a numerical sequence with respect to the number of fails; Set the one or more input pins to the simulation condition for power modeling of the unit; and Determine a number of design errors of the unit based on the simulation condition.

1 Claim, 4 Drawing Sheets

| CHECK | A | B | C | FAIL |
|---|---|---|---|---|
| 1 | 0 | 0 | 0 | 189 |
| 2 | 0 | 0 | 1 | 189 |
| 3 | 0 | 1 | 0 | 189 |
| 4 | 0 | 1 | 1 | 189 |
| 5 | 1 | 0 | 0 | 189 |
| 6 | 1 | 0 | 1 | 189 |
| 7 | 1 | 1 | 0 | 13 |
| 8 | 1 | 1 | 1 | 189 |

Related U.S. Application Data continuation of application No. 15/041,068, filed on Feb. 11, 2016.

(51) Int. Cl.
*G06F 1/26* (2006.01)
*G06F 17/10* (2006.01)

(52) U.S. Cl.
CPC ...... *G06F 17/5036* (2013.01); *G06F 17/5081* (2013.01); *G06F 2217/66* (2013.01); *G06F 2217/78* (2013.01)

(58) Field of Classification Search
CPC ............... G06F 17/504; G06F 17/5081; G06F 2217/66; G06F 2217/78
USPC ...................................... 703/18, 13
See application file for complete search history.

(56) References Cited

U.S. PATENT DOCUMENTS

| | | |
|---|---|---|
| 7,747,971 B1 | 6/2010 | Chopra et al. |
| 7,774,728 B2 | 8/2010 | Frenkil |
| 8,005,660 B2 | 8/2011 | Chiu et al. |
| 8,650,513 B2 | 2/2014 | Salz et al. |
| 8,707,229 B1 | 4/2014 | Dobkin et al. |
| 8,775,985 B2 * | 7/2014 | Wang ............... G01R 31/31704 703/15 |
| 8,954,904 B1 | 2/2015 | Loh et al. |
| 8,954,909 B2 | 2/2015 | Andraus et al. |
| 9,104,824 B1 | 8/2015 | Loh et al. |
| 9,262,303 B2 * | 2/2016 | Schalick ............. G06F 11/3648 |
| 9,460,251 B1 | 10/2016 | Haridass et al. |
| 2008/0077893 A1 | 3/2008 | Korson et al. |
| 2016/0154902 A1 * | 6/2016 | Korthikanti ......... G06F 17/5045 716/107 |

OTHER PUBLICATIONS

IBM, Appendix P, List of IBM Patents or Patent Applications Treated as Related, 2 pages, dated Dec. 1, 2016.

* cited by examiner

| CHECK | A | B | C | FAIL |
|---|---|---|---|---|
| 1 | 0 | 0 | 0 | 189 |
| 2 | 0 | 0 | 1 | 189 |
| 3 | 0 | 1 | 0 | 189 |
| 4 | 0 | 1 | 1 | 189 |
| 5 | 1 | 0 | 0 | 189 |
| 6 | 1 | 0 | 1 | 189 |
| 7 | 1 | 1 | 0 | 13 |
| 8 | 1 | 1 | 1 | 189 |

FORMAL VERIFICATION DRIVEN POWER MODELING AND DESIGN VERIFICATION

The present invention relates generally to intellectual property ("IP") power modeling and in particular to determining the simulation condition of IP designs for power model generation.

BACKGROUND

The visibility of component power behavior is provided through the use of IP power models, which are created for power estimation at higher levels of design. An IP power model is an abstraction of the power behavior of a component that provides specification of the supported component power state and power consumption data. The IP power model may provide power consumption data for each enumerated power state (e.g., functional mode, test mode, etc.) in the power model which may significantly impact the overall power consumption of the component. Determining the simulation condition for the different input pins of the IP blocks is critical to generate an accurate power model. Poorly constructed power models may cause erroneous power analysis and subsequent chip or system power projections. Similarly, there may be instances in a design where the IP block input pin conditions have been violated. However, due to the rapid growth and complexity of systems, such as microprocessors, generation of IP power models and verification of IP designs have become increasingly difficult, are time consuming, and are prone to error.

SUMMARY

A computer program product includes one or more computer readable storage media and program instructions stored on the one or more computer readable storage media. The program instructions include instructions to receive a unit, wherein the unit includes register transfer level content expressed in a hardware description language for a component of an integrated circuit and one or more IP blocks. The program instructions further include instructions to select one or more input pins for each of the one or more IP blocks. Each of the one or more input pins are selected if the input pin remains constant at a logic state of zero or one. The program instructions further include instructions to assign a numerical value of either zero or one to each of the one or more input pins to yield at least one numerical sequence. The program instructions further include, for each numerical sequence of the at least one numerical sequence, instructions to perform a check on the numerical sequence to yield a number of fails. The check includes formal verification of each of the one or more IP blocks based on the numerical sequence of the one or more input pins. The number of fails includes a count of errors in the numerical sequence of the one or more input pins. The program instructions further include instructions to determine a simulation condition for power modeling of the unit based on optimizing a numerical sequence with respect to the number of fails. The simulation condition includes the numerical sequence that yields the least amount of fails. The program instructions further include instructions to set the one or more input pins to the simulation condition for the power modeling of the unit. The program instructions further include instructions to determine a number of design errors of the unit based on the simulation condition, the number of design errors includes one or more instances in a design of the register transfer level content where the numerical sequence is incorrect. A corresponding computer system and computer program product are also disclosed.

DETAILED DESCRIPTION

Irrespective of the power model type (e.g., .lib, contributor-based, etc.) or the approach used for generating the power model (e.g., circuit simulation, logic simulation, etc.) determining the simulation condition for the different input pins of the IP blocks that form an integrated circuit ("IC") (e.g., microprocessor) is critical for generating an accurate power model of the system. However, an IC may generally consist of thousands of IP blocks, created by hundreds of register transfer level ("RTL") designers, who are employed by multiple IP block vendors. To complicate matters further, the input pin conditions of the IP blocks are also dependent on the mode (e.g. functional mode, test mode, etc.) for which the power model is to be generated.

Currently, the input pin conditions of the IP blocks are manually set according to IP design guides, which may take several days to weeks to complete. Consultations with IP design experts and RTL designers may further be necessary to correctly set the input pin conditions of the IP blocks for power model generation. Nonetheless, this current process remains highly prone to error and a single incorrect setting of an input pin for an IP block may result in notable error (upwards of 50%) in chip power estimates. Even when the input pins are set correctly for power model generation, there still may exist design errors which further contribute to an improper power analysis.

Embodiments of the present invention recognize that it may be desirable to automatically determine the simulation condition for the different input pins of the IP blocks for power model generation. Embodiments of the present invention may further recognize that it may be desirable to simultaneously determine any design errors during power model generation. A design error may be understood as an error in the correct input pin conditions in the design of RTL content.

Figure 1:
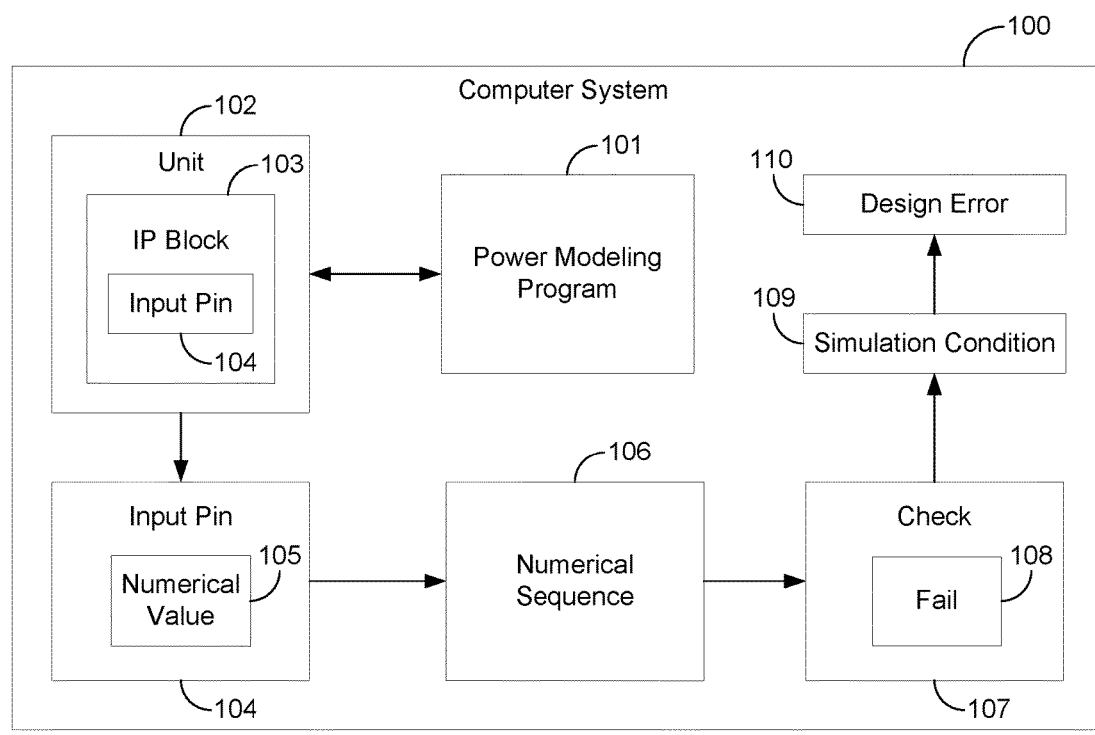
FIG. 1 is a block diagram of one embodiment of a computer system environment 100 suitable for operation in accordance with at least one embodiment of the invention.

Referring now to various embodiments of the invention in more detail, FIG. 1 is a block diagram depicting one embodiment of a computer system environment suitable for operation in accordance with at least one embodiment of the invention. Within a computer system 100, a power modeling program 101 may receive a unit 102. A unit 102 may be understood as RTL content for a component of an IC. More specifically, each unit may include one or more IP blocks 103. In digital circuit design, an IP block 103 may be understood as a reusable unit of logic that is the intellectual property of an entity.

The power modeling program 101 may further select one or more input pins 104 for each of the one or more IP blocks 103. An input pin 104 may be understood as a pin that remains at either a logic state of 0 or a logic state of 1. The power modeling program 101 may further assign a numerical value 105 to each of the one or more input pins 104 to yield at least one numerical sequence 106.

The power modeling program 101 may further, for each numerical sequence 106 of the at least one numerical sequence 106, perform a check 107 on the numerical sequence 106 to yield a number of fails 108. A check 107 may be understood as formal verification of each of the one or more IP blocks 103 based on the numerical sequence 106 of the one or more input pins 104. Generally, formal verification is the act of proving or disproving the correctness of intended behavior of a system with respect to a certain formal specification or property of one or more underlying algorithms, using formal methods of mathematics. For example, formal verification may be used to verify that a design intent (i.e., specification) is preserved in its implementation (i.e., RTL content). A fail 108 may be understood as an error in the numerical sequence 106 for the one or more input pins 104.

The power modeling program 101 may further determine a simulation condition 109 for power modeling of the unit 102 based on optimizing a numerical sequence 106 with respect to the number of fails 108. The power modeling program 101 may further determine a number of design errors 110 of the unit 102 based on the simulation condition 109. Here, even under the correct simulation condition 109 for power modeling of the unit 102, a number of design errors 110 of the unit 102 may be determined according to the number of fails 108 present.

The power modeling program 101 may exist in a cloud-based, virtual, or distributed environment or a remote environment on defined server hardware. Furthermore, the power modeling program 101 may implement parallel processing for one or more checks 107 for the one or more IP blocks 103. For example, the power modeling program 101 may implement the use of input/output (I/O) parallelism, which enables concurrent I/O streams to be initiated for one or more checks 107 for the one or more IP blocks 103. In another example, the power modeling program 101 may implement the use of query computer processor (CP) parallelism, which enables multitasking of I/O streams and computer processing units (CPU) for one or more checks 107 for the one or more IP blocks 103. With CP parallelism, one or more checks 107 for the one or more IP blocks 103 may be executed concurrently with one another on multiple processors.

Figure 2:
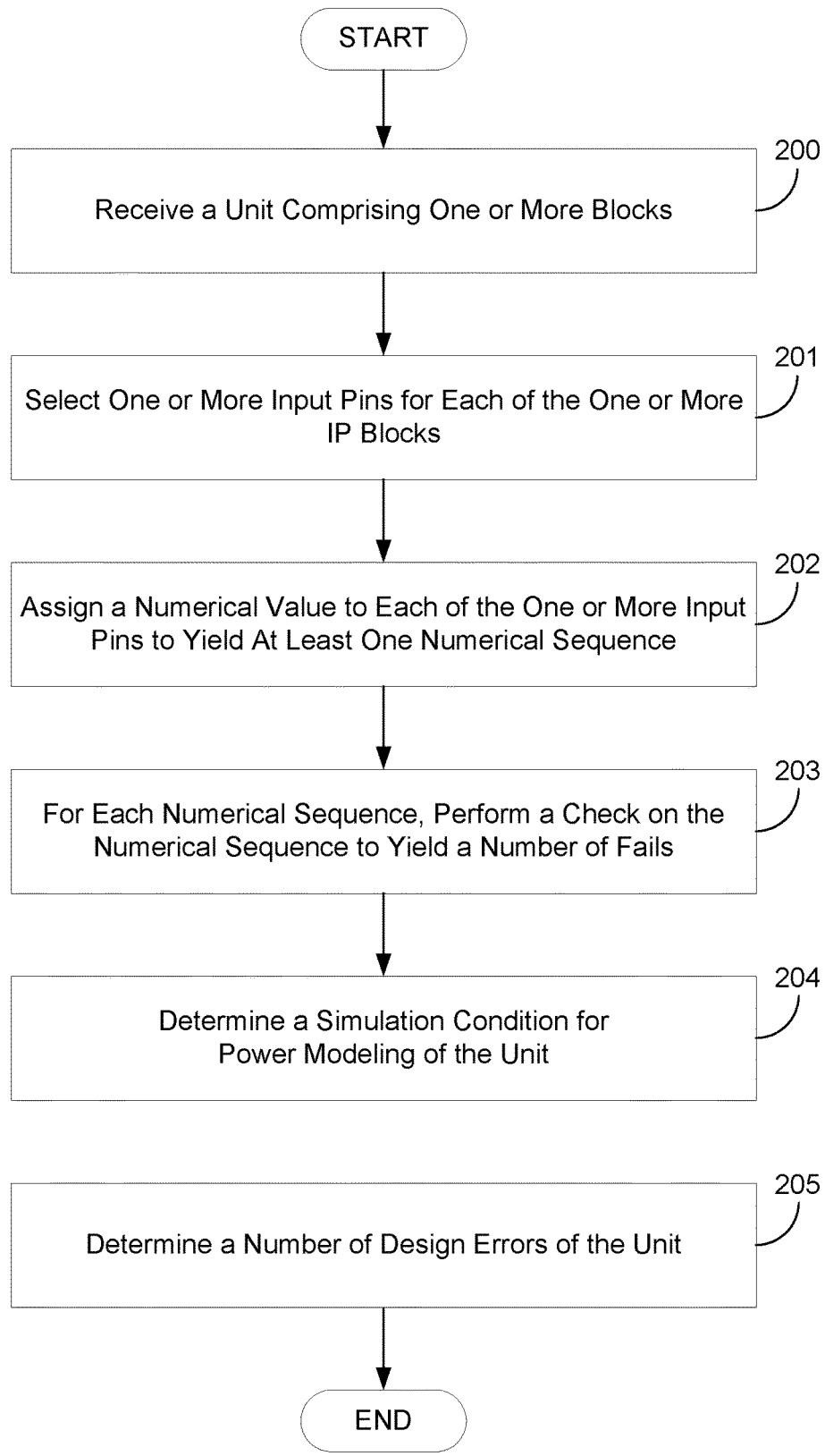
FIG. 2 is a flow chart diagram depicting the power model program in accordance with at least one embodiment of the invention.

FIG. 2 is a flow chart diagram depicting the power modeling program in accordance with at least one embodiment of the invention. According to the depicted embodiment, at step 200, the power modeling program 101 may receive a unit 102. In one embodiment of the invention, the power modeling program 101 may receive a unit 102 for an analog IC (e.g., op-amps, linear regulators, phase locked loops, oscillators, and active filters). In another embodiment of the invention, the power modeling program 101 may receive a unit 102 for a digital IC (e.g., microprocessor, field-programmable gate array (FPGA), memory (e.g., RAM, ROM, flash, etc.), and application specific integrated circuit (ASIC)). For example, the power modelling program may receive a unit 102 of a microprocessor. Units 102 of a microprocessor may include, but are not limited to the execution unit, load-store unit, instruction fetch unit, and condition register unit. In any embodiment, the unit 102 may be in the form of RTL content, which is a method of abstraction for defining the analog or digital portions of a circuit design based on synchronous logic. Generally, RTL content may consist of registers, combinatorial logic, and clocks, which may be written in hardware description languages (HDLs) such as Verilog and Very High Speed Integrated Circuit Hardware Description Language (VHDL).

The unit 102 may further include one or more IP blocks 103. Generally, an IP block 103 may be in the form of standard cells, digital blocks, and analog blocks.

At step 201, the power modeling program 101 may select one or more input pins 104 for each of the one or more IP blocks 103. Here, the one or more input pins 104 selected by the power modeling program 101 are the input pins 104 whose condition for power modeling need to be determined. In one embodiment of the invention, the power modeling program 101 may select one or more input pins 104 based on manual user input of the input pins 104 of interest in accordance with a power model guide. In another embodiment of the invention, the power modeling program 101 may automatically determine the input pins 104 of interest by performing formal verification for all of the input pins 104 of each of the one or more IP blocks 103 to find those input pins 104 which do not toggle (i.e., switch).

At step 202, the power modeling program 101 may assign a numerical value 105 to each of the one or more input pins 104 to yield at least one numerical sequence 106. More specifically, the power modeling program 101 may assign a numerical value 105 of either zero or one. Here, a numerical sequence 106 may be understood as the assignment of numerical values 105 to subsequently selected input pins 104. For example, in step 201, the power modeling program 101 may select input pins X, Y, and Z. In step 202, the power modeling program 101 may assign the numerical value 1 to input pin X, the numerical value 0 to input pin Y, and the numerical value 1 to input pin Z. Thus, the assignment of a numerical value 105 to input pins X, Y, and Z would yield the numerical sequence (101). The power modeling program 101 may continue to repeat step 202 until every possible numerical sequence 106 for the one or more input pins 104 has been established.

At step 203, the power modeling program 101 may, for each numerical sequence 106 of the at least one numerical sequence 106, perform a check 107 on the numerical sequence 106 to yield a number of fails 108. The power modeling program 101 may perform a check 107 on each numerical sequence 106 established in step 202. Here, the power modeling program 101 may use formal verification to prove or disprove the correctness of the numerical sequence 106 of the one or more input pins 104 for each of the one or more IP blocks 103. In other words, each time the power modeling program 101 performs a check 107, the power modeling program 101 may engage in the formal verification of a different numerical sequence 106 of the one or more input pins 104 to determine the correct input pin 104 settings for power model generation of the unit 102.

In one embodiment of the invention, the power modeling program 101 may use model checking formal verification. Model checking may be employed using any domain-specific abstraction techniques, such as state space enumeration, symbolic state space enumeration, abstract interpretation, and symbolic simulation. In another embodiment of the invention, the power modeling program 101 may use equivalence checking formal verification. Equivalence checking may be employed using any generally known methods, including, but not limited to binary decision diagrams (BDDs) and conjunctive normal form satisfiability.

The power modeling program may yield a number of fails 108 based on the numerical sequence 106 assigned to the one or more input pins 104. The power modeling program 101 may yield a number of fails 108 for each check 107 performed in step 203. The power modeling program 101 may further yield a fail 108 for each of the one or more IP blocks 103 for each check 107 performed in step 203. Here, a fail 108 is the result of formal verification disproving the correctness of the numerical sequence 106 of the one or more input pins 104 for the proper input pin 104 settings for power model generation of the unit 102. In other words, a fail 108 is an error in the numerical sequence 106 of the one or more input pins 104 for an IP block 103 of the unit 102.

At step 204, the power modeling program 101 may determine a simulation condition 109 for power model generation of the unit 102 based on optimizing a numerical sequence 106 with respect to the number of fails 108. Optimizing may be understand as the numerical sequence 106 that yields the least number of fails 108. A number of fails 108 may include a count of errors in the numerical sequence 106 of the one or more input pins 104. Here, the numerical sequence 106 that yields the least amount of fails 108 corresponds to the proper input pin 104 settings that should be used for power model generation of the unit 102.

At step 205, the power modeling program 101 may determine a number of design errors 110 of the unit 102 based on the simulation condition 109. More specifically, the number of design errors 110 of the unit 102 may be the number of design errors 110 of the RTL content. Here, each fail 108 may correspond to a design error 110 in the RTL content for one or more IP blocks 103. It should be appreciated that determining a number of design errors 110 at this level of design may enable an RTL designer to modify the RTL content prior to implementing the RTL content in a physical design (i.e., circuit design, physical design, etc.).

Figure 3:
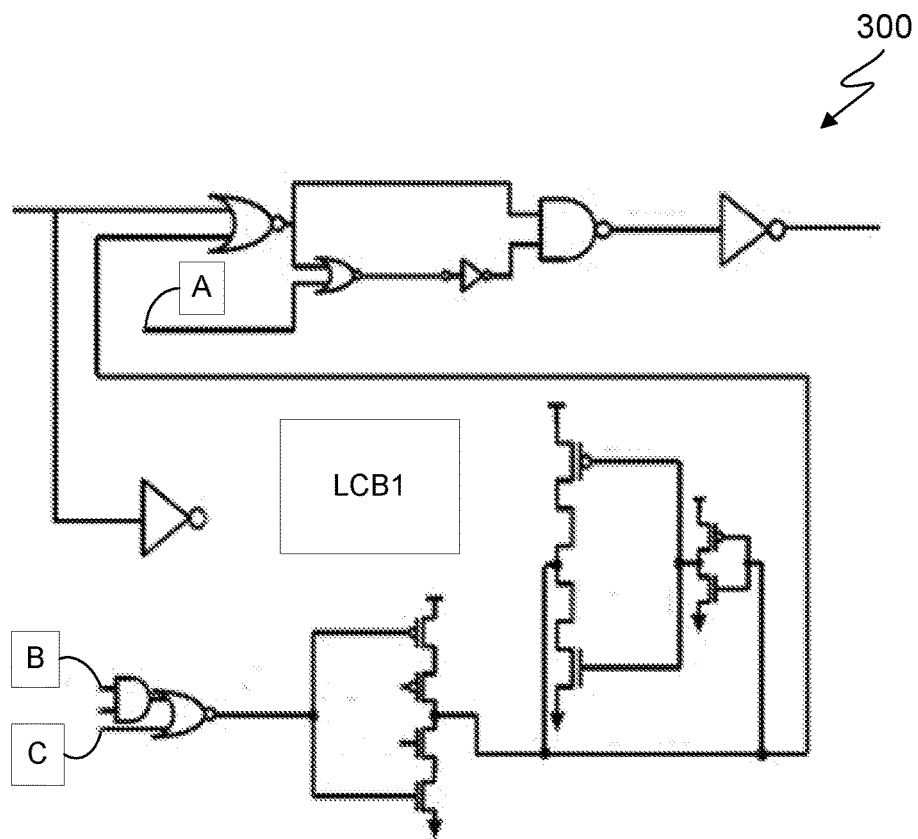
FIG. 3 is an exemplary diagram for a portion of a worked example of the power model program in accordance with at least one embodiment of the invention.

FIG. 3 is an exemplary diagram for a portion of a worked example of the power modeling program in accordance with at least one embodiment of the invention. In FIG. 3, the power modeling program 101 has received a unit 102 of RTL content written in HDL code. More specifically, the unit 102 of RTL content received by the power modeling program 101 may be for the load-store unit of a microprocessor. In this case, the load-store unit includes multiple IP blocks 103, of which there are 189 instances of an LCB1 cell. However, instances of other types of cells (e.g., LCB2, LCB3, etc.) may be present in the unit 102 of RTL code.

Upon receiving the RTL content for the load-store unit of a microprocessor, the power modeling program 101 may select one or more input pins 104 for each LCB1 cell incorporated in one or more IP blocks 103. Here, the power modeling program 101 has selected input pins A, B, and C for each of the 189 instances of the LCB1 cell that are incorporated within the RTL content of the one or more IP blocks 103 of the load-store unit. The power modeling program 101 may further assign a numerical value 105 to input pins A, B, and C for each instance of a LCB1 cell to yield at least one numerical sequence 106. The power modeling program 101 may continue to assign a numerical value 105 to input pins A, B, and C until the possible numerical sequences 106 of input pins A, B, and C has been exhausted. As demonstrated in FIG. 3, the power modeling program 101 has assigned the following numerical sequences 106 to input pins A, B, and C: 000, 001, 010, 011, 100, 101, 110, and 111.

The power modelling program may further perform a check 107 for each numerical sequence 106 of input pins A, B, and C. Here, the power modeling program 101 has performed eight individual checks 107 (i.e., one check 107 for each numerical sequence 106). For each enumerated check 107 (check 1 through check 8), the power modeling program 101 has yielded a number of fails 108 based on the numerical sequence 106 of input pins A, B, and C. Here, the power modeling program 101 has yielded 189 fails for each of checks 1, 2, 3, 4, 5, 6, and 8 and 13 fails for check 7. More specifically, each fail 108 is representative of an error in the pin settings for input pins A, B, and C of an LCB1 cell.

The power modelling program may further determine a simulation condition 109 for power model generation of the load-store unit based on optimizing (i.e. the numerical sequence 106 that yields the least amount of fails 108) a numerical sequence 106 with respect to the number of fails 108. Here, the numerical sequence 106 that yielded the least amount of fails (13) was the numerical sequence (110) for input pins A, B, and C. Thus, it can be said that the power modeling program 101 has determined that the numerical sequence (110) for input pins A, B, and C is the simulation condition 109 that should be used for power model generation of the LCB1 cell. The power modeling program 101 may further automatically set input pins A, B, and C to the correct numerical sequence (110) for each instance of the 189 instances of the LCB1 cell incorporated in the one or more IP blocks 103 of the load-store unit for power model generation of the LCB1 cell.

The power modeling program 101 may further determine a number of design errors 110 of the load-store unit RTL content based on the simulation condition 109. In an error free design, the correct simulation condition 109 for power model generation should yield 0 fails 108. Here, the power modeling program 101 has identified 13 fails (i.e., 13 design errors) in the RTL content for the 189 instances of the LCB1 cell incorporated in the one or more IP blocks 103 of the load-store unit.

Figure 4:
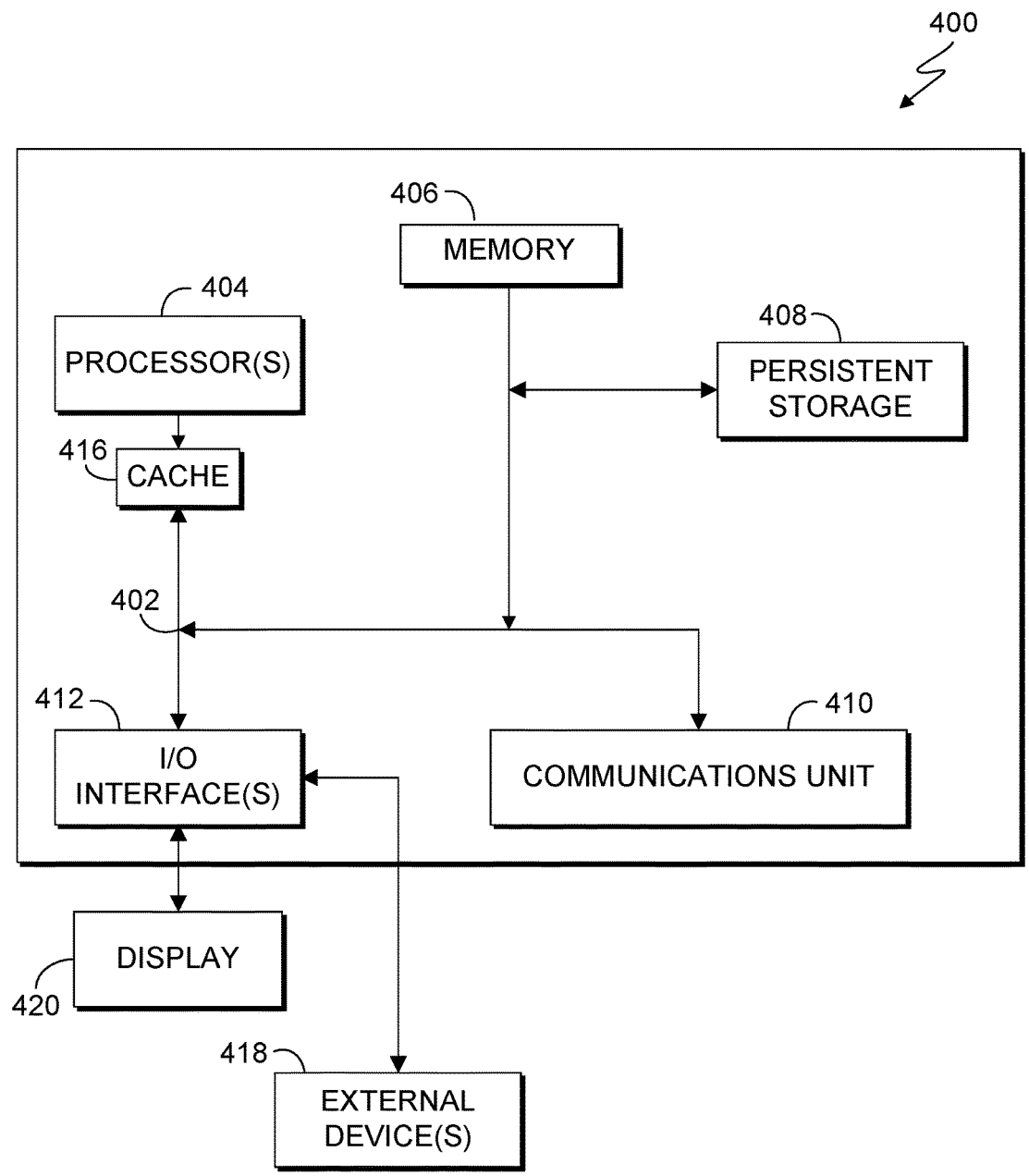
FIG. 4 is a block diagram of a computing apparatus 400 suitable for executing the power model program in accordance with at least one embodiment of the invention.

FIG. 4 is a block diagram depicting components of a computer 400 suitable for executing the power modeling program 101. Figure displays the computer 400, the one or more processor(s) 404 (including one or more computer processors), the communications fabric 402, the memory 406, the RAM 416, the cache 418, the persistent storage 408, the communications unit 412, the I/O interfaces 414, the display 422, and the external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for the power modeling program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 406 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising one or more non-transitory computer readable storage media and program instructions stored on said one or more non-transitory computer readable storage media, said program instructions comprising instructions to:

receive a unit, said unit comprising register transfer level content expressed in a hardware description language for a component of an integrated circuit, said unit further comprising one or more IP (intellectual property) blocks;

select one or more input pins for each of said one or more IP blocks, each of said one or more input pins being selected if said input pin remains constant at a logic state of zero or one;

assign a numerical value of either zero or one to each of said one or more input pins to yield at least one numerical sequence;

for each numerical sequence of said at least one numerical sequence, perform a check on said numerical sequence to yield a number of fails, said check comprising formal verification of each of said one or more IP blocks based on said numerical sequence of said one or more input pins, said number of fails comprising a count of errors in said numerical sequence of said one or more input pins;

determine a simulation condition for power modeling of said unit based on optimizing a numerical sequence with respect to said number of fails, said simulation condition comprising said numerical sequence that yields the least amount of fails;

set said one or more input pins to said simulation condition for said power modeling of said unit;

determine a number of design errors of said unit based on said simulation condition, said number of design errors comprising one of more instances in a design of said register transfer level content where said numerical sequence is incorrect; and modify said register transfer level content based on said determined design errors.

* * * * *